United States Patent [19]
Baits

[11] 4,097,200
[45] Jun. 27, 1978

[54] SELF-PRESSURIZATION SYSTEM FOR GEARBOXES AND THE LIKE

[75] Inventor: Stephen S. Baits, Rockford, Ill.

[73] Assignee: Sundstrand Corporation, Rockford, Ill.

[21] Appl. No.: 756,498

[22] Filed: Jan. 3, 1977

[51] Int. Cl.² ............................................. F04B 49/08
[52] U.S. Cl. .................................... 417/302; 417/306
[58] Field of Search ............... 417/302, 281, 306, 366, 417/13; 137/565; 74/687

[56] References Cited

U.S. PATENT DOCUMENTS

| | | | |
|---|---|---|---|
| 2,402,499 | 6/1946 | Lawrence | 417/306 |
| 2,836,345 | 5/1958 | Gerteis | 417/281 |
| 3,044,406 | 7/1962 | Kristenson | 417/366 X |
| 3,365,981 | 1/1968 | Gantzer | 74/687 |
| 3,588,285 | 6/1971 | Moon | 417/281 X |
| 3,600,106 | 8/1971 | Baits et al. | 74/687 X |

Primary Examiner—David H. Brown
Attorney, Agent, or Firm—Wegner, Stellman, McCord, Wiles & Wood

[57] ABSTRACT

For gear boxes, constant speed drives and the like having an airtight housing, a self-pressurization system includes a source of liquid, a pump having a discharge port connected to the housing, a check valve in a conduit extending between atmosphere and the pump intake port, and a valve responsive to the pressure differential between the housing and atmosphere and connected between the source of liquid and the pump intake port to deliver large amounts of liquid to the pump when the pressure differential is high and to deliver air and minimal lubricating amounts of liquid when the pressure differential is low.

11 Claims, 1 Drawing Figure

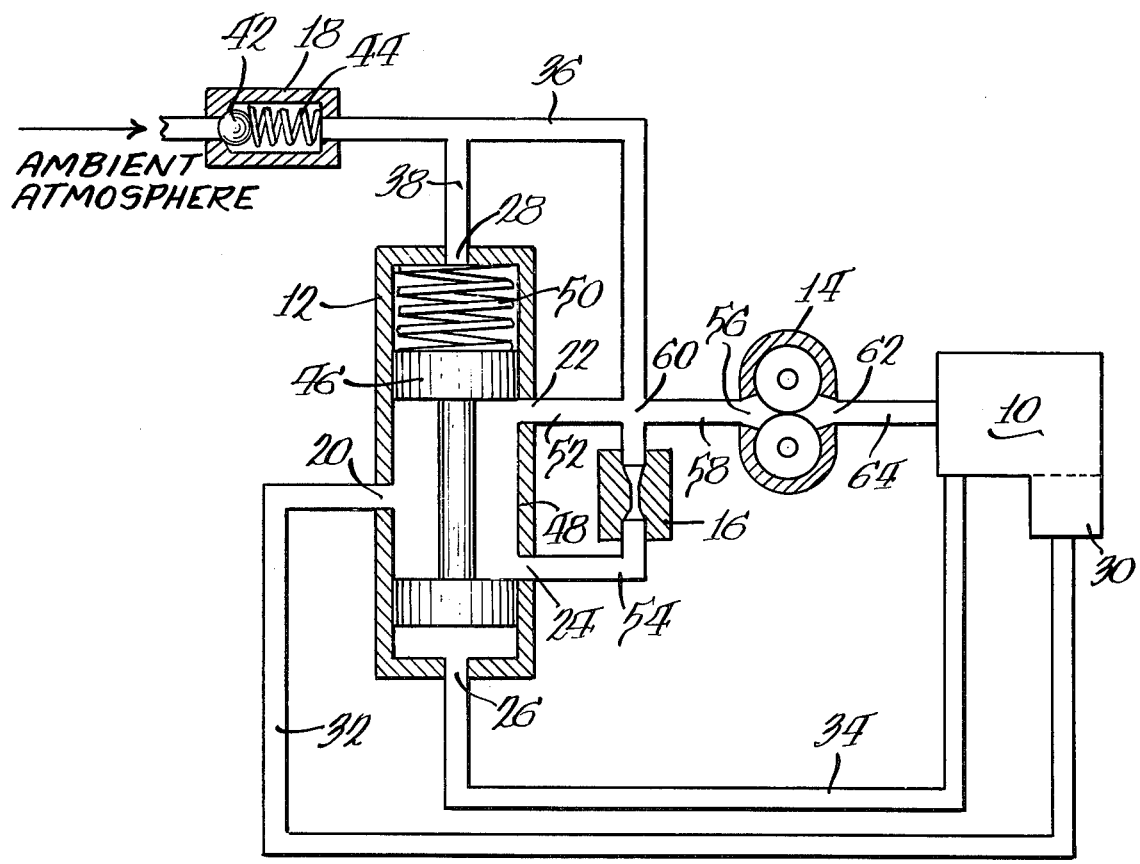

SELF-PRESSURIZATION SYSTEM FOR GEARBOXES AND THE LIKE

BACKGROUND OF THE INVENTION

This invention relates generally to a means for pressurizing a housing so that liquid may be more readily withdrawn from the sump of the housing and supplied to drive assembly components within the housing for lubrication and control purposes.

Aircraft drive assemblies, such as gear boxes and constant speed drives, often employ a scavenge pump in the housing to withdraw liquid from the sump. An example of such a mechanism is Gantzer U.S. Pat. No. 3,365,981, entitled "Combined Fluid and Mechanical Drive," assigned to the assignee of the present invention. These devices do not scavenge well at high altitudes if the pressure in the drive housing or case is not above the ambient pressure. Baits et al U.S. Pat. No. 3,600,106, entitled "Self-Pressurizing Scheme," also assigned to the assignee of the present invention, shows a means for pressurizing the housing or case when the ambient pressure exceeds the case pressure by a predetermined amount. Therein, air-entrained liquid was transmitted to the sump by employing an injector and a differential pressure valve. One problem encountered with this type of scheme is that the system has a tendency to become "air bound" at very high altitudes, i.e., low atmospheric pressure, due to bubbles coming out of the driving fluid.

One method of suitably pressurizing the case would be to employ a displacement pump for supplying air thereto. However, the pump cannot be allowed to run dry without lubrication, and provision must be made to avoid overpressurization of the case, preferably without blowing anything overboard.

Reeve U.S. Pat. No. Re. 28,428, while not relating to a case pressurization system, shows a pump which will pump one liquid until outlet pressure builds up and shifts a valve to connect an air passage to the pump intake so that liquid and air are delivered to the pump. The valve operates on both oil and air intake conduits. However, the amount of oil cannot be regulated so that at least a minute amount of oil is always delivered to the pump.

In a pressurization system as disclosed herein, the air from atmosphere should be cut off completely when the housing pressure reaches a predetermined level.

Bales U.S. Pat. No. 2,650,577 and Stone U.S. Pat. No. 2,782,773 relate to engine pressurization systems including pressurization of the crankcase. Bales shows an oil pump, but includes no valve for regulating air or oil intake into the crankcase. Stone shows the use of a diaphragm which builds up pressure in the crankcase.

SUMMARY OF THE INVENTION

It is the principal object of the invention to enhance the practicability of using a displacement pump to pressurize a drive housing.

In accordance with the invention, a pump having its discharge port connecting to the housing is employed to pressurize the housing with ambient air drawn through a conduit communicating with the atmosphere. A valve responsive to a pressure differential between the housing and atmosphere regulates the amount of liquid, such as lubricating oil, delivered to the intake port of the pump in order to control the amount of ambient air delivered by the pump. When housing pressure relative to atmospheric pressure is high, a substantial amount of oil is delivered to the pump so as to exclude ambient air. As a result, there is positive exclusion when the desired pressure in the housing is reached. When the pressure differential is low, only a small amount of oil is delivered to provide constant lubrication to the pump and wet the clearances of the pump for efficient operation and thereby permit air to be drawn into the system.

In such a system, a positive constant displacement pump may be used without overpressurizing the housing and having overboard flow.

The pressurization system of the invention includes an air intake conduit between the atmosphere and the pump intake port having a check valve therein, a conduit between a source of oil and the inlet to the pressure-responsive valve, and a pair of conduits between the valve outlet and the pump intake port, one of which has an orifice restricting oil flow to less than the pump displacement. The valve has one pilot port communicating with the housing. The total pressure created by a biasing spring and atmospheric pressure opposes the housing pressure. When the housing pressure is high relative to atmospheric pressure, the valve delivers oil through the unrestricted conduit, thereby closing the check valve; if low, oil is delivered through the conduit having the orifice to limit the oil flow, thereby permitting ambient air to be drawn into the system.

BRIEF DESCRIPTION OF THE DRAWING

The FIGURE is a schematic illustration of a hydraulic circuit permitting self-pressurization of a housing.

DESCRIPTION OF PREFERRED EMBODIMENT

An example environment in which this circuit may generally be employed is shown in U.S. Patent No. 3,600,106, cited earlier. Therein, the drive assembly has a housing, drive means in the housing including input and output shafts, a sump in the housing, and pump means operatively associated with the drive means for withdrawing liquid, such as oil, from the sump and supplying oil to a reservoir. As will become apparent, the self-pressurization system herein described may be substituted for the injector and the differential pressure valve utilized therein. The details of the drive assembly form no part of the invention disclosed herein.

Referring to the drawing, a self-pressurization system for a drive assembly housing 10 such as shown in the above referred to patent is seen to primarily include a valve 12, a positive constant displacement pump 14, an orifice 16, and a check valve 18. These components may be disposed within the housing 10 which is airtight.

The valve 12 has an inlet 20, outlets 22 and 24, and pilot ports 26 and 28. The inlet 20 is connected by a conduit 32 to a source of oil 30 which may be a reservoir in the housing 10. The source of oil 30 may be the lube pressure in the return conduit which delivers makeup, lubricating and control fluid for the system. This could be a connection to line 63 of the above referred to patent. The pilot port 26 communicates with the housing 10 including the sump via a conduit 34 so that pressure in the housing 10 is transmitted to the valve 12. The pilot port 28 is connected to an air intake conduit 36 by a conduit 38.

The check valve 18 is in the conduit 36 between the end open to the atmosphere and the conduit 38. The check valve 18 has a valve member 42 which is biased to a closed position by a small centering spring 44. The force provided by the spring 44 is relatively low and acts only to return the valve member 42 to its seat when the conduit 36 is sealed from the atmosphere.

The valve 12 includes a spool 46 slidable within a bore 48 and is biased towards the pilot port 26 by a spring 50 providing a reference pressure or force. A typical reference pressure would be 5 p.s.i. The reference pressure is augmented by atmospheric pressure delivered through conduit 38 from the air intake conduit 36. An aneroid reference could be used to regulate to an absolute pressure, but this is usually not necessary.

The spool 46 is selectively movable to a first position, as shown in the drawing, communicating the inlet 20 with the outlet 22 and the conduit 52 and a second position (not illustrated) closing this connection. The orifice 16 is in the conduit 54 to always provide a small flow of oil into the pump 14. Whenever the valve 12 is moved to its second position, air is drawn into the housing 10 and, at the same time, the pump 14 is lubed and the clearance gaps wet.

The pump 14 is a positive constant displacement pump having an intake suction port 56 connected to a conduit 58 which communicates with the conduits 36, 52 and 54 at a junction 60. The pump has a discharge port 62 communicating with the housing 10 through a conduit 64. The pump acts to reduce the pressure in its suction chamber whereby pressure is reduced at its intake port so that external pressure (herein, the pressure normally acting on the oil source 30) pushes oil into the pump.

The amount of ambient air the pump 14 will draw in can be regulated by controlling the amount of oil supplied to the pump 14. If sufficient oil is provided to the pump 14, its suction port pressure will rise above ambient and no air will be drawn in. The supply of oil to the pump 14, and hence to the housing 10, is in turn controlled by the valve 12.

When the housing pressure is less than 5 p.s.i. more than ambient atmospheric pressure (minus minor loss in the check valve 18), the spring 50 controls, and the valve spool 46 is moved to its second position to starve the pump 14 so that air flowing from the conduit 36 to the pump 14 is drawn into the system to pressurize the housing 10. The orifice 16 provides for lubrication flow for the pump 14 at all times the unit is operated.

When housing pressure is over 5 p.s.i. more than the ambient atmospheric pressure, the housing pressure acts through the conduit 34 against the spring 50 and shifts the valve spool 46 upwardly, as shown in the drawing, whereby oil flows into the conduit 52. As a result, the pump intake port 56 is pressurized, which along with the back pressure from the valve 12 acts against the valve member 42 to pressurize the check valve 18, close it and block off the air supply. Thereafter, air is prevented from being drawn into the housing 10, and only oil is circulated in the system to terminate continued pressurization of the housing 10. When the relative pressure differential between the housing and atmosphere is lowered, atmospheric pressure opens the check valve 18 and acts through conduits 36 and 38 to shift the valve 12 to its second position once again.

I claim:

1. A pressurization system for a sealed case or housing having parts to be lubricated and a sump to collect the lubricating oil whereby pressurization improves withdrawal of lubricatig oil from the sump comprising a positive displacement pump having its outlet connected to said case, a source of lubricating oil under pressure, a conduit connected to atmosphere and having a check valve spring-urged to a position to block the flow of ambient air through said conduit, said pump having an inlet connected to said conduit, a control valve connected to said source of lubricating oil and having outlet means connected to the inlet of said pump, said control valve being operable between a first position to provide an unrestricted flow path between said source of lubricating oil and the inlet of said pump and at least one other position to provide a restricted flow path for oil flow to the pump and which is limited to less than the demand of said pump, and means responsive to difference in pressure between a reference pressure and the pressure within said case for controlling the position of the valve to regulate the rate of flow of lubricating oil through said outlet means to the inlet of said pump, said responsive means placing said control valve in said first position when the difference between case pressure and the reference pressure exceeds a predetermined amount and in said other position when the difference between case pressure and the reference pressure is less than said predetermined amount, whereby restricted flow of lubricating oil to said pump permits drawing of air through said conduit to build up pressure within the case and substantially unrestricted flow of lubricating oil to said pump satisfies the demand of the pump whereby air is not drawn through said conduit.

2. For use with gear boxes, constant speed drive and the like employing a housing, a self-pressurization system comprising:

a pump having an intake port and a discharge port connected to the housing for pressurizing the housing;

a conduit open to atmosphere and communicating with said intake port;

a check valve in said conduit to prevent flow to atmosphere;

a source of liquid under pressure;

valve means having an inlet connected to said source of liquid;

outlet means associated with said valve means providing communication between said valve means and said intake port, said valve means having a first operable position connecting said source of liquid with said outlet means to permit liquid flow from said source of liquid to said pump through said outlet means at a rate which is at least equal to the displacement of said pump and having at least one other position restricting liquid flow from said source of liquid to said pump to a rate less than the displacement of said pump; and means associated with said valve means and being responsive to a difference in pressure between a reference pressure and the pressure within the housing to control the operation and said valve means, said valve means being moved to its first position when the housing pressure relative to the reference pressure increases to a predetermined amount, and said valve means being moved to said other position when the housing pressure relative to the reference pressure decreases below said predetermined amount.

3. The self-pressurization system of claim 2 wherein said pump is a positive displacement pump.

4. The self-pressurization system of claim 2 wherein said valve means has a pilot port communicating with the housing, and further including means for continuously biasing said valve means to said other position, pilot pressure from the housing opposing the combined pressure of said biasing means and the reference pressure to urge the said valve means to said first position.

5. The self-pressurization system of claim 2 wherein said valve means has a pilot port communicating with the housing and a pilot port communicating with said conduit, said valve means being positioned in response to the pressures at said ports.

6. The self-pressurization system of claim 5 wherein said valve means is a spool valve and said outlet means includes a pair of outlets, each of said outlets being connected to a respective outlet conduit communicating with said intake port of said pump, one of said outlet conduits having an orifice formed therein to restrict flow of liquid therethrough, said spool valve selectively operable to connect said inlet with either of said outlets.

7. The self-pressurization system of claim 5 further including means for continuously biasing said valve means to said other position, said biasing means applying pressure of a predetermined amount.

8. The self-pressurization system of claim 7 wherein said biasing means is a spring.

9. The self-pressurization system of claim 7 wherein the pressures at said pilot ports act against one another, pilot pressure from the housing opposing the combined pressure of said biasing means and atmospheric pressure to urge said valve means to said first position.

10. For use in a drive having drive housing means with a fluid sump and pump means operatively associated with the drive means for withdrawing fluid from the sump and supplying liquid to the drive, a self-pressurization system comprising:
  a source of liquid;
  a displacement pump having an intake port and a discharge port communicating with the housing;
  a valve having an inlet communicating with said source of liquid, a first outlet communicating with said intake port of said pump and a second outlet communicating with said intake port of said pump and having an orifice therebetween, said valve operable between a first position providing communication between said inlet and said first outlet and a second position providing communication between said inlet and said second outlet;
  means for continuously biasing said valve to said second position at a predetermined pressure;
  an air intake conduit providing communication between the ambient atmosphere and said intake port of said pump;
  a pilot port communicating with housing pressure to act against said biasing means to shift said valve to said first position when the pressure in said pilot port exceeds atmospheric pressure by said predetermined amount; and
  a check valve disposed along said air intake conduit to prevent liquid flow to the atmosphere, so that when housing pressure exceeds ambient atmospheric pressure by said predetermined amount, said first-named valve is operated to direct liquid from said source of liquid to said pump through said first outlet, pressure at said intake port of said pump causing said check valve to close to prevent flow of air through said air intake conduit from atmosphere.

11. For use with gear boxes, constant speed drives and the like employing a housing, a self-pressurization system comprising:
  a pump having an intake port and a discharge port connected to the housing;
  a first conduit open to the atmosphere communicating with said intake port;
  a source of liquid; and
  a valve responsive to a pressure differential between the housing and the atmosphere having an inlet and a pair of outlets, a second conduit between said source of liquid and said inlet, a third conduit having an orifice between one outlet and said intake port, a fourth conduit between the other outlet and said intake port, said valve providing communication between said second and third conduits when the housing pressure relative to atmospheric pressure decreases to a predetermined amount so that air from atmosphere flows through said first conduit to said intake port, said valve providing communication between said second and fourth conduits when the housing pressure relative to atmospheric pressure increases to said predetermined amount so that air flow is prevented to said intake port.

* * * * *